(12) United States Patent
Alshammary

(10) Patent No.: US 9,439,403 B2
(45) Date of Patent: Sep. 13, 2016

(54) AQUAPONIC METHOD AND APPARATUS FOR USE IN ARID ENVIRONMENTS

(75) Inventor: Saad F. Alshammary, Riyadh (SA)

(73) Assignee: KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 75 days.

(21) Appl. No.: 12/795,828

(22) Filed: Jun. 8, 2010

(65) Prior Publication Data
US 2011/0297097 A1 Dec. 8, 2011

(51) Int. Cl.
A01K 63/04 (2006.01)
A01G 31/00 (2006.01)

(52) U.S. Cl.
CPC ............... *A01K 63/04* (2013.01); *A01G 31/00* (2013.01); *Y02P 60/216* (2015.11)

(58) Field of Classification Search
CPC ..... A01K 63/04; A01K 63/045; A01G 31/00
USPC ....... 119/200, 207, 211, 226, 227, 228, 229, 119/231, 246, 247, 259; 47/1.01 R, 62 R, 47/62 N, 48.5
See application file for complete search history.

(56) References Cited

U.S. PATENT DOCUMENTS

| | | | | |
|---|---|---|---|---|
| 4,149,970 A | * | 4/1979 | Atkins et al. | 47/62 N |
| 4,866,880 A | * | 9/1989 | Weinblatt | 47/79 |
| 5,036,618 A | * | 8/1991 | Mori | 47/1.1 |
| 5,046,451 A | * | 9/1991 | Inslee et al. | 119/227 |
| 5,176,100 A | * | 1/1993 | Fujino | 119/259 |
| 5,618,428 A | * | 4/1997 | Oslund | 210/602 |
| 6,117,313 A | * | 9/2000 | Goldman et al. | 210/151 |
| 2006/0254332 A1 | * | 11/2006 | Bissonnette et al. | 71/31 |
| 2007/0151522 A1 | * | 7/2007 | Brauman | 119/228 |
| 2010/0031893 A1 | * | 2/2010 | Bodlovich | C02F 3/32 119/227 |

OTHER PUBLICATIONS

Lennard et al., "A comparison of three different hydroponic subsystems (gravel bed, floating and nutrient film technique) in an Aquaponic test system", Aquacult Int (2006), pp. 539-550.

(Continued)

*Primary Examiner* — Lisa Tsang
(74) *Attorney, Agent, or Firm* — Andrew M. Calderon; Roberts Mlotkowski Safran, Cole & Calderon, P.C.

(57) ABSTRACT

An aquaponic method and apparatus used to raise fish in fish rearing tanks is combined with hydroponic channels for growing crops, in which fertilizer nutrients from the aquaculture effluent are utilized as fertilizer. The aquaponic method and apparatus produce a first water circulation system during the day in which water is repeatedly cycled from a sump, bypassing fish rearing tanks, to a clarifier for removing solids, a degasifier for removing volatile compound, then to the hydroponic channels, and then, back from the hydroponic channels to the sump. The aquaponic method and apparatus also produce a second circulation system during the night in which water is repeatedly cycled from the sump to the fish rearing tanks, from the fish rearing tanks to the clarifier, then from the clarifier to the hydroponic channels and then back from the hydroponic channels to the sump.

18 Claims, 2 Drawing Sheets

(56) References Cited

OTHER PUBLICATIONS

Fitzsimmons, "Future Trends of Tilapia Aquaculture in the Americas", 2000, vol. 2, pp. 252-264, The World Aquaculture Society.

Tyson et al., "Water pH Impacts Sustainability of Recirculating Aquaponic Systems", Vegetarian Newsletter, Sep. 2007, 5 pages, University of Florida.

Diver, "Aquaponics—Integration of Hydroponics with Aquaculture", A Publication of ATTRA, pp. 1-28, Copyright 2006.

Rakocy et al., "Tilapia Production Systems for the Lesser Antilles and Other Resource-Limited Tropical Areas", pp. 86-103 (Date unknown).

Rackocy et al., "Update on Tilapia and Vegetable Production in the UVI Aquaponic System", 15 pages (Date unknown).

* cited by examiner

AQUAPONIC METHOD AND APPARATUS FOR USE IN ARID ENVIRONMENTS

FIELD OF THE INVENTION

The invention relates to aquaponic systems in which an aquaculture system used to raise fish in fish rearing tanks is combined with hydroponic channels for growing crops, and more particularly, to the subsystems by which water is moved from the fish rearing tanks to sedimentation tanks for removing solids and to the hydroponic channels for growing crops in which fertilizer nutrients from the aquaculture effluent are utilized as fertilizer, and after which, the water flows back to a sump from which water is pumped back to the fish tanks.

BACKGROUND OF THE INVENTION

In known systems of the above mentioned type, the pH of the water system is raised and maintained in the range of 6-7 by adding an appropriate amount of potassium hydroxide (KOH), calcium oxide (CaO), or calcium hydroxide [$Ca(OH)_2$]. Fish manure containing irrigation water provides a source organic fertilizer to enable plants to grow, while the hydroponics serves as a biofiltration method to facilitate intensive recirculating aquaculture.

In theory, aquaponic systems would be well suited to arid environments due to the low water requirements associated with the recycling of water between the aquaculture fish rearing tanks and the hydroponic plant growing channels. However, in arid environments, such as Saudi Arabia, it has been observed that, in such aquaponic systems, plants do not grow well because some of the essential plant nutrients are not in an available form, so that the growing plants suffer from nutrient deficiency (such as insufficient phosphorus). As a result, production is not economical, so that the existing aquaculture systems are not economically practical in such arid environments.

Accordingly, there exists a need in the art to overcome the deficiencies and limitations described above.

SUMMARY OF THE INVENTION

In a first aspect of the invention, an aquaponic method, comprises the steps of:

operating a first water circulation system during the day in which water is repeatedly cycled from a sump to a clarifier, such as sedimentation tanks and netting tanks, for removing solids, then from the clarifier to hydroponic channels and then back from the hydroponic channels to the sump; and operating a second circulation system during the night in which water is repeatedly cycled from fish rearing tanks to the clarifier, then from the clarifier to hydroponic channels and then back from the hydroponic channels to the fish rearing tanks.

In a second aspect of the invention, the pH of the water during operation of the first water circulation system is maintained in a range of 5.5-6.5 by adding phosphoric acid ($H_3PO_4$) to the water. During operation of the second water circulation system, since no photosynthesis occurs during the nighttime, the water pH is not regulated.

In a third aspect of the invention, the water moves from the clarifier to degassing tanks before passing to the hydroponic channels.

In accordance with another aspect of the invention, an aquaponic system is provided that comprises fish rearing tanks, a clarifier for removing solids, a water sump, hydroponic channels for raising plants, fluid flow lines and a valve arrangement that create alternately operable flow paths to the fish rearing tanks or the clarifier from the sump, fluid flow lines that create a flow path from the clarifier to the hydroponic channels, fluid flow lines creating a flow path from the hydroponic channels to the water sump, and a valve arrangement. In a first operating mode of the valve arrangement, a first water circulation path is created in which water is repeatedly cycled from the sump to the clarifier, then from the clarifier to the hydroponic channels and then back from the hydroponic channels to the sump; and in a second operating mode of the valve arrangement creates a second water circulation path in which water is repeatedly cycled from the fish rearing tanks to the clarifier, then from the clarifier to the hydroponic channels and then back from the hydroponic channels to the fish rearing tanks.

In accordance with a further aspect of the invention, the aquaponic system further comprises degassing tanks disposed between the clarifer and the hydroponic channels and the clarifier comprises sedimentation tanks and netting tanks.

In accordance with yet another aspect of the invention, optionally, the aquaponic system further comprises a device for adding phosphoric acid to the water during operation of the valve arrangement in the first operating mode in an amount for maintaining the pH of the water in a range of 5.5-6.5, the device being inoperative during operation of the valve arrangement in the second operating mode. However, it is possible for the phosphoric acid to be added manually.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

Figure 1:
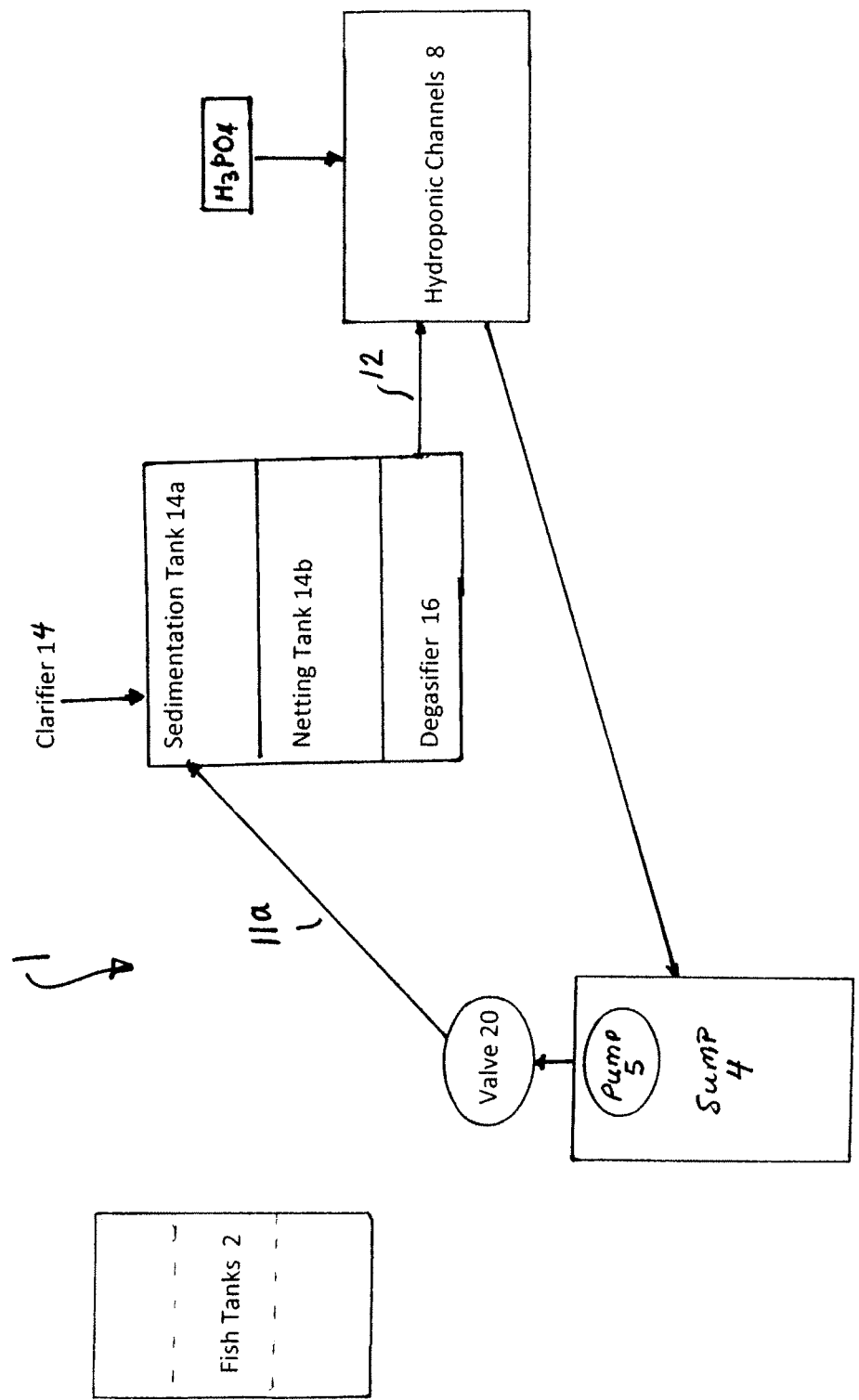
FIG. 1 schematically shows a system in accordance with the present invention in its daytime operating mode.
Figure 2:
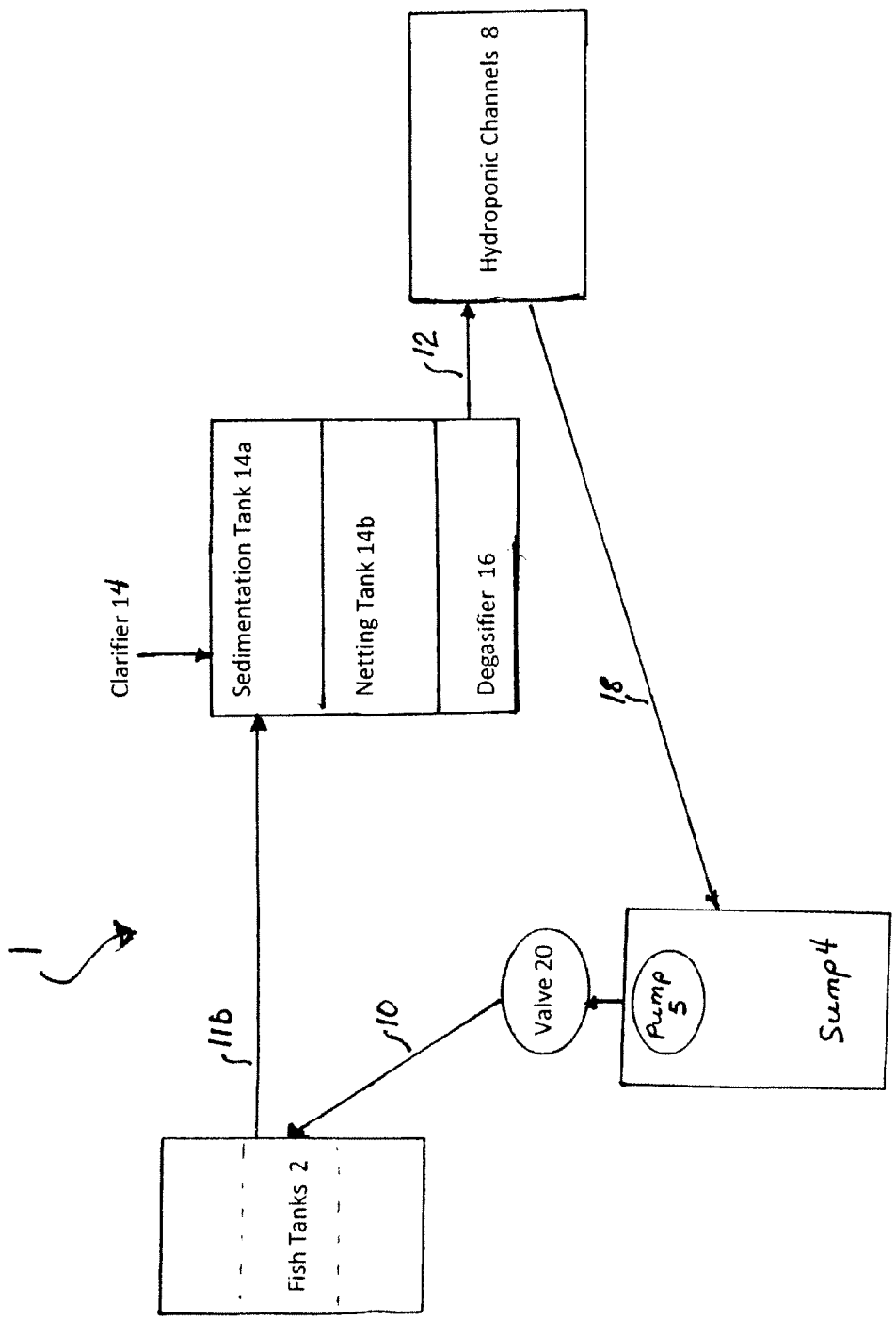
FIG. 2 schematically shows a system in accordance with the present invention in its nighttime operating mode.

In following description of the present invention and in the claims, references to fish tanks should be viewed as encompassing any known fish rearing structures and ponds. Likewise, references to hydroponic channels should be viewed as encompassing any known types of receptacles used for the hydroponic growing of plants, and references to fluid flow lines should be viewed as encompassing any known types of liquid conveying conduits, tubings and pipes suitable for directing a flow of water to and from the various components of aquaponic systems.

In accordance with the invention, an aquaponic system 1 is provided that comprises fish rearing tanks 2, a water sump 4 which can contain a pump 5 for circulating water (this location of the pump is not essential), hydroponic channels 8 for raising plants, fluid flow lines 10 creating a flow path to the fish rearing tanks 2 from the sump 4, fluid flow lines 11*a*, 11*b* creating a flow path to the clarifier 14 (e.g., sedimentation tanks 14*a* and netting tanks 14*b*) and degasifier 16 from the sump 4 or fish rearing tanks 2, respectively, fluid flow lines 12 creating a flow path from the clarifier 14 to the hydroponic channels 8, fluid flow lines 18 creating a flow path from the hydroponic channels 8 to the water sump 4, and a valve arrangement 20 which selectively opens/ closes fluid flow lines 11a, 11b as described in connection with the inventive method below. Furthermore, a pH adjusting device can optionally be provided for adding phosphoric acid ($H_3PO_4$) to the water during one of two modes of operation of the valve arrangement as described below.

The various tanks can be formed, e.g., of concrete, stainless steel or other materials from which toxins will not be leached into the water. The clarifier which removes solids from the water and the degasifier which removes volatile organic compounds can be of any known type and a biofilter (not shown) may be provided as well. The fluid flow lines can be, e.g., PVC pipes.

The method of operation of the aquaponic system 1 of the present invention will now be described with reference to FIG. 1.

In the first operating mode of the aquaponic system 1, which is a daytime mode, the valve arrangement 20 creates a first water circulation path in which water bypasses the fish rearing tanks 2 via flow line 11a from the sump 4, being pumped to the clarifier 14, e.g., sedimentation tanks 14a and netting tanks 14b, where solids are removed from the water, then to the degasifier 16 where volatile organic compounds are removed from the water, and then on to the hydroponic channels 8. From the hydroponic channels, the water is returned to the sump, which can be performed by gravity feed and the cycle repeatedly. During this daytime operating mode, the pH of the water circulating in the system is maintained in the range of 5.5-6.5 by adding phosphoric acid ($H_3PO_4$) to the water. The daytime operating mode not only enables plants to better absorb nutrient elements, but also protects fish from the detrimental effects of added chemicals. In this regard, while it is represented in FIG. 1 that the phosphoric acid is added at the hydroponic channels 8, it could be added at the sump 4 or elsewhere in the water circulation path. Advantageously, the entire amount of phosphoric acid is added (manually or automatically) all at one time to the degassing tank at the beginning of the daytime cycle.

At the end of the day, the valve arrangement 20 disconnects flow line 11a so that, in a second nighttime operating mode, a second water circulation path is created in which water is repeatedly cycled from sump 4 through flow line 10 to the fish rearing tanks and from there, via flow line 11b to the clarifier 14 (sedimentation tanks 14a and netting tanks 14b) and degasifier 16 and on to the hydroponic channels 8, after which the water is then directed back from the hydroponic channels 8 to the sump 4. Prior to the end of the daytime operating mode, the effects of the supplied phosphoric acid disappear and the pH of the water cycling in the system goes back to a pH of at least 7.0 by the around the time that the nighttime operating mode is commenced.

While a single (two-way) valve is represented for directing flow from the pump to either flow line 11 a to the clarifier 14 or to flow line 10 to the fish rearing tanks 2, which is preferably an automatic timer-controlled valve, a separate opened/closed valve can be provided in each of the lines 10, 11a, one being opened while the other is closed.

The foregoing examples have been provided for the purpose of explanation and should not be construed as limiting the present invention. While the present invention has been described with reference to an exemplary embodiment, Changes may be made, within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed is:

1. An aquaponic system, comprising:
    fish rearing tanks,
    a clarifier for removing solids,
    a water sump,
    hydroponic channels for raising plants,
    a first fluid flow path connecting the fish rearing tanks and sump to the clarifier,
    a second fluid flow path connecting the sump to the clarifier in bypassing relationship to the fish rearing tanks,
    a third fluid flow path from the clarifier to the hydroponic channels, wherein the third fluid flow path is devoid of the water sump,
    a fourth fluid flow path connecting the hydroponic channels with the water sump, and
    a valve arrangement,
    wherein said valve arrangement has a first operating mode which creates a first water circulation path in which water is repeatedly cycled from the sump to the clarifier via the second fluid flow path, then from the clarifier to the hydroponic channels and back from the hydroponic channels to the sump via the third and fourth fluid flow paths, respectively; and
    wherein said valve arrangement has a second operating mode which creates a second water circulation path in which water is repeatedly cycled from the sump to the fish rearing tanks and to the clarifier via said first fluid flow path, then from the clarifier to the hydroponic channels and then back from the hydroponic channels to the sump via the third and fourth fluid flow paths, respectively, and
    further comprising a device structured to maintain a pH of the water in the first operating mode at a lower level than the pH of the water in the second operating mode, wherein the device is structured to add phosphoric acid to the water only during operation of said valve arrangement in the first operating mode in an amount for maintaining the pH of the water in a range of 5.5-6.5, and for stopping the addition of the phosphoric acid to the water prior to the end of the first operating mode such that, by the beginning of the second operating mode, the water reverts to a pH of at least 7.0from the pH in the range of 5.5-6.5.

2. The aquaponic system according to claim 1, further comprising degassing tanks disposed between the clarifier and the hydroponic channels, and wherein the clarifier comprises sedimentation tanks and netting tanks.

3. The aquaponic system according to claim 1, wherein the device is structured to add phosphoric acid to the water only during operation of the the valve arrangement in the first operating mode in an amount for maintaining the pH of the water in a range of 5.5-6.5.

4. The aquaponic system according to claim 1, wherein said valve arrangement comprises a single valve for directing flow from a pump to either the clarifier or to the fish rearing tanks.

5. The aquaponic system according to claim 1, wherein said valve arrangement is an automatic timer-controlled valve.

6. The aquaponic system according to claim 1, wherein said valve arrangement comprises a first open/closed valve in the first fluid flow path and a second open/closed valve in the second fluid flow path.

7. The aquaponic system according to claim 1, wherein prior to an end of said first operating mode, the water reverts to a pH of at least 7.0 from a pH in a range of 5.5-6.5.

8. The aquaponic system according to claim 1, wherein the first operating mode is a daytime operating mode and the second operating mode is a nighttime operating mode.

9. The aquaponic system according to claim 8, wherein the clarifier further comprises a biofilter.

10. The aquaponic system according to claim 9, wherein the hydroponic channels are located above the sump so that water is returned from the hydroponic channels to the sump in the first and second operating modes by gravity feed.

11. The aquaponic system according to claim 10, wherein the device is connected to the sump to add the phosphoric acid to water in the sump.

12. An aquaponic system, comprising:
fish rearing tanks,
a clarifier,
a water sump,
a degassifier,
hydroponic channels,
a first fluid flow path directly connecting the fish rearing tanks to the clarifier,
a second fluid path directly connecting the clarifier to the degassifier,
a third fluid path directly connecting the degassifier to the hydroponic channels, wherein the third fluid path is devoid of the water sump,
a fourth fluid path directly connecting the hydroponic channels to the water sump, and
a valve arrangement connecting the sump to either the clarifier or the fish rearing tanks, wherein:
  the valve arrangement has a first operating mode and a second operating mode,
  in the first operating mode, the valve arrangement bypasses the fish rearing tanks and provides the water flow to the clarifier, and
  in the second operating mode, the valve arrangement provides water flow directly to the fish rearing tanks which, in turn provides the water flow to the clarifier via the first fluid flow path, and
further comprising a device structured to maintain a pH of the water in the first operating mode at a lower level than the pH of the water in the second operating mode, wherein the device is structured to add phosphoric acid to the water only during operation of said valve arrangement in the first operating mode in an amount for maintaining the pH of the water in a range of 5.5-6.5, and for stopping the addition of the phosphoric acid to the water prior to the end of the first operating mode such that, by the beginning of the second operating mode, the water reverts to a pH of at least 7.0 from the pH in the range of 5.5-6.5.

13. The aquaponic system according to claim 12, wherein said valve arrangement comprises a single valve for directing flow from a pump to either the clarifier or to the fish rearing tanks.

14. The aquaponic system according to claim 12, wherein said valve arrangement is an automatic timer-controlled valve.

15. The aquaponic system according to claim 12, wherein said valve arrangement comprises a first open/closed valve connecting the sump to the fish rearing tanks and a second open/closed valve connecting the sump to the clarifier.

16. The aquaponic system according to claim 12, wherein the device is structured to add phosphoric acid to the water only during the first operating mode in an amount for maintaining a pH of the water in a range of 5.5-6.5.

17. The aquaponic system according to claim 12, wherein, prior to an end of said first operating mode, the water reverts to a pH of at least 7.0 from a pH in a range of 5.5-6.5.

18. The aquaponic system according to claim 12, wherein the first operating mode is a daytime operating mode and the second operating mode is a nighttime operating mode.

* * * * *